(12) United States Patent
Chen

(10) Patent No.: US 6,192,025 B1
(45) Date of Patent: Feb. 20, 2001

(54) STRUCTURE FOR PROTECTING READING AREA OF COMPACT DISC AND DEVICE FOR APPLYING SAME

(76) Inventor: Yong E. Chen, No. 24, Alley 8, Lane 133, Section 4, Nanking E. Road, Taipei (TW)

(*) Notice: Under 35 U.S.C. 154(b), the term of this patent shall be extended for 0 days.

(21) Appl. No.: 09/305,193

(22) Filed: May 5, 1999

(51) Int. Cl.[7] .............................. G11B 7/24; G11B 33/14; B32B 3/00
(52) U.S. Cl. .................. 369/291; 369/283; 428/64.4; 428/66.6
(58) Field of Search ........................ 369/283, 284, 369/289, 290, 291, 292; 428/64.6, 64.2, 64.3, 64.4, 65.2, 65.5, 66.6; 206/307, 308.1, 313

(56) References Cited

U.S. PATENT DOCUMENTS

| | | | |
|---|---|---|---|
| 4,556,968 | * 12/1985 | Pelkey et al. | 369/284 |
| 4,879,710 | 11/1989 | Ijima | 369/291 |
| 5,020,048 | * 5/1991 | Arai et al. | 369/291 |
| 5,299,186 | * 3/1994 | Tsurushima | 360/133 |
| 5,757,765 | 5/1998 | Chen | 369/291 |
| 5,787,069 | * 7/1998 | Lowe et al. | 369/291 |
| 5,922,430 | * 7/1999 | Biddlecome | 428/66.6 |
| 5,935,673 | * 8/1999 | Mueller | 428/64.1 |
| 6,081,501 | * 6/2000 | Hunter et al. | 369/290 |

FOREIGN PATENT DOCUMENTS

| | | | |
|---|---|---|---|
| 1-105370 | * 4/1989 | (JP) | 369/290 |
| 94/14161 | * 6/1994 | (WO) | 369/291 |
| 95/12881 | * 5/1995 | (WO) | 369/291 |

* cited by examiner

*Primary Examiner*—David L. Ometz
(74) *Attorney, Agent, or Firm*—Bacon & Thomas

(57) ABSTRACT

A structure for protecting the reading area of a compact disc includes a transparent protective film and a two-side-adhesive ring. The protective film has an outer diameter equal to or slightly smaller than the outer diameter of the compact disc, and a center hole with a diameter greater than the protruded ring of the compact disc. The two-side-adhesive ring has an inner diameter equal to or slightly greater than the protruded ring of the compact disc, and an outer diameter greater than the inner diameter thereof by 2–5 mm. The structure is applied by an applicator to the compact disc such that the protective film is attached to the reading area of the compact disc by static attraction, and further that the inner annular portion of the protective film is held by the two-side-adhesive ring adhering to the annular portion surrounding the protruded ring of the compact disc.

4 Claims, 3 Drawing Sheets

US 6,192,025 B1

STRUCTURE FOR PROTECTING READING AREA OF COMPACT DISC AND DEVICE FOR APPLYING SAME

FIELD OF THE INVENTION

The present invention relates generally to a structure for protecting musical CD, CD-ROM and DVD multimedia compact disc, and more particularly to a structure for protecting the reading area of a compact disc.

BACKGROUND OF THE INVENTION

A digital disc, such as musical CD, MD mini-compact disc, CD-ROM, DVD compact disc, etc., is used to store a large amount of digital data in the form of microscopic pits which are formed densely and serially on the digital disc. The digital disc is generally formed with a transparent protective outer layer for protecting the integrity of data stored in the reading area of the digital disc. The digital disc is played on a device using a laser beam to read the encoded information stored on the disc. It is therefore conceivable that a reading distortion may be resulted from a damaged or contaminated protective layer. For this reason, the user of the compact disc is advised to handle the compact disc carefully.

The Taiwan Patent Publication No. 312232 describes an annular strip, as a prior art, for protecting a compact disc in such a manner that the annular strip is attached fixedly to the rim of the compact disc, so as to prevent the reading area of the compact disc from making contact with a surface at such time when the compact disc is placed on the surface by utilizing the height of the annular strip.

The inventor of the Taiwan Patent Publication No. 312232 discloses another structure for protecting a compact disc to improve the annular strip. The structure comprises a protective film which has a thickness of 60 microns ($\mu$m) or less. The protective film is adhered by static attraction to the surface of the reading side of the compact disk and is also adhered by adhesive to the inner annular portion thereof. Such a protective film as described above has several drawbacks, which are described hereinafter.

The side of the reading area of the compact disc has a protruded ring surrounding the central hole thereof, which will cause the protective film not being able to be attached flatly to the surface of the reading side, especially at the portion near the protruded ring of the compact disc. As a result, the static attracted portion of the protective film is prone to become detached.

The adhesive can not be easily applied to the inner annular portion of the compact disc in terms of the position and the quantity of the adhesive. In addition, the reading area of the compact disc is vulnerable to contamination by the adhesive. Moreover, the adhesive availability must be taken into consideration.

The same inventor, in U.S. Pat. No. 5,757,765, further discloses an improved structure to the invention disclosed in the Taiwan Patent Publication No. 312232, in which an annular adhesive sheet is used to replace the adhesive applied to the inner annular portion of the compact disc. However, the protective film still has a complicated shape at its inner rim portion and suffers the above-mentioned first drawback of the structure disclosed in the Taiwan Patent Publication No. 312232.

SUMMARY OF THE INVENTION

The primary objective of the present invention is therefore to provide a compact disc protection structure free from the shortcomings of the prior art structures described above.

A structure for protecting a reading area at one side of a compact disc constructed according to the present invention comprises:

a transparent circular plastic film having an outer diameter equal to or smaller than an outer diameter of the compact disc, said circular plastic film further having a center hole with a diameter greater than a protruded ring on said one side of the compact disc; and a two-side-adhesive ring having an inner diameter equal to or greater than the protruded ring of the compact disc, said two-side-adhesive ring further having an outer diameter greater than said inner diameter by 2–5 mm;

wherein one side of said two-side-adhesive ring is adhere to an inner annular portion of said circular plastic film and another side of said two-side-adhesive ring is adhered to said one side of the compact disc with the protruded ring thereof surrounded by the two-side-adhesive ring, wherein said transparent circular plastic film is concentrically attached to said two-side-adhesive ring, and is attached to the reading area of the compact disc by static attraction.

The present invention further provides a device for applying said structure to the reading area of the compact disc, which comprises:

an alignment ring provided with an inner hole having a diameter substantially equal to the diameter of the center hole of the compact disc, said alignment ring having an outer diameter equal to or greater than the protruded ring of the compact disc and smaller than said inner diameter of said two-side-adhesive ring.

Preferably, said device further comprises a press cover having a hollow cylindrical body, and said hollow cylindrical body has an inner diameter greater than said outer diameter of said alignment ring and an outer diameter smaller than said outer diameter of said two-side-adhesive ring.

The objective, features, functions, and advantages of the present invention will be readily understood upon a thoughtful deliberation of the following detailed description of a preferred embodiment of the present invention with reference to the accompanying drawings.

DETAILED DESCRIPTION OF THE EMBODIMENTS

Figure 1:
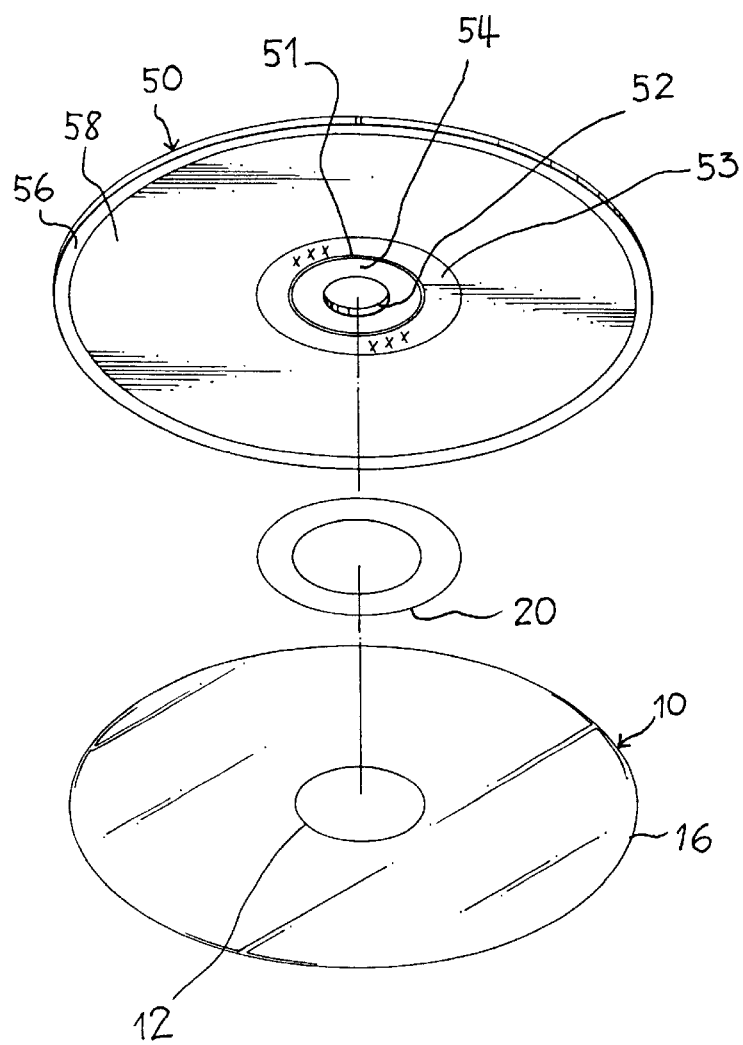
FIG. 1 shows a schematic perspective view of a protective structure of the preferred embodiment of the present invention along with a schematic perspective view of a compact disc to which the protective structure of the present invention is to be applied.
Figure 2:
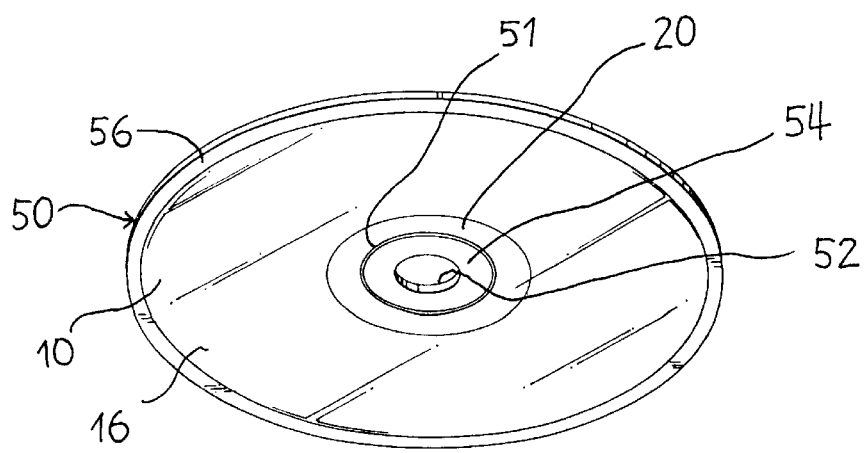
FIG. 2 shows a perspective view of the compact disc provided with the protective structure of the present invention as shown in FIG. 1.

As shown in FIGS. 1 and 2, a compact disc 50 having a center hole 52 is provided with an inner annular area 54 encircling the center hole 52, a protruded ring 51 encircling the inner annular area 54, a labeling area 53 encircling the protruded ring 51, and a reading area 58 located between said labeling area 53 and an outer annular area 56 on one side thereof (the reading side). The reading area 58 is formed of microscopic pits for storing digital data. A protective film 10 of the present invention is transparent and has a thickness ranging between 0.1–0.5 mm. The protective film 10 is made of polyester or polycarbonate and is specified to fit the compact disc 50 such that an inner circular edge 12 and an outer circular edge 16 of the protective film 10 are respectively contiguous to the protruded ring 51 and the outer annular area 56 of the compact disc 50 at the time when the protective film 10 is applied to the compact disc 50 for protecting the reading area 58 thereof.

The protective film 10 of the present invention is applied in conjunction with a two-side-adhesive ring 20 having a thickness smaller that the thickness of the protective film 10, an inner diameter equal to or greater than the protruded ring 51, and an outer diameter greater than said inner diameter by 2–5 mm, preferably 5 mm. The ring 20 has a width smaller than that of the labeling area 53 of the compact disc 50. The ring 20 is adhered to the labeling area 53 where no data are stored but the manufacturer's information as represented by x x x shown in FIG. 1.

Figure 3:
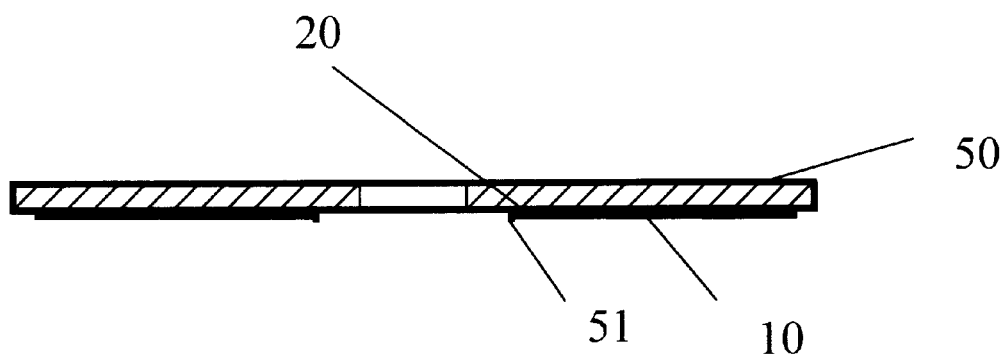
FIG. 3 shows a sectional view of the compact disc and the protective structure in combination as shown in FIG. 2.

As shown in FIG. 3, the reading area 58 of the compact disc 50 is effectively protected by the protective film 10 of the present invention from cut or contamination. In the event that the protective film 10 is damaged or contaminated, the protective film 10 can be easily replaced with a new one, without replacing the ring 20 which remains intact.

Figure 4:
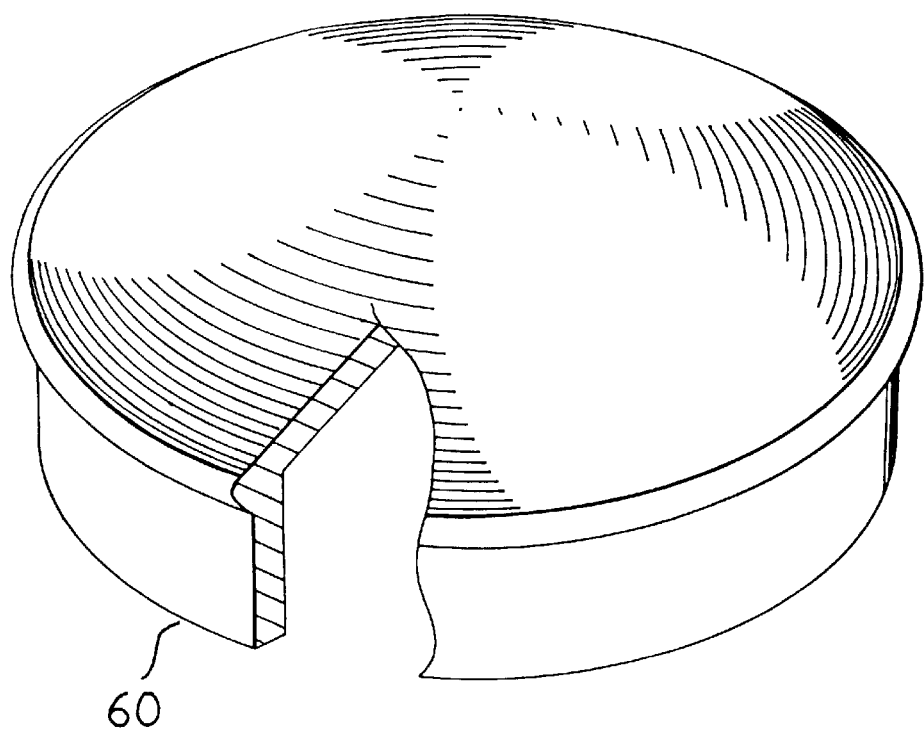
FIG. 4 shows a partial sectional view of an applicator for applying the protective structure of the present invention to a compact disc.
Figure 4:
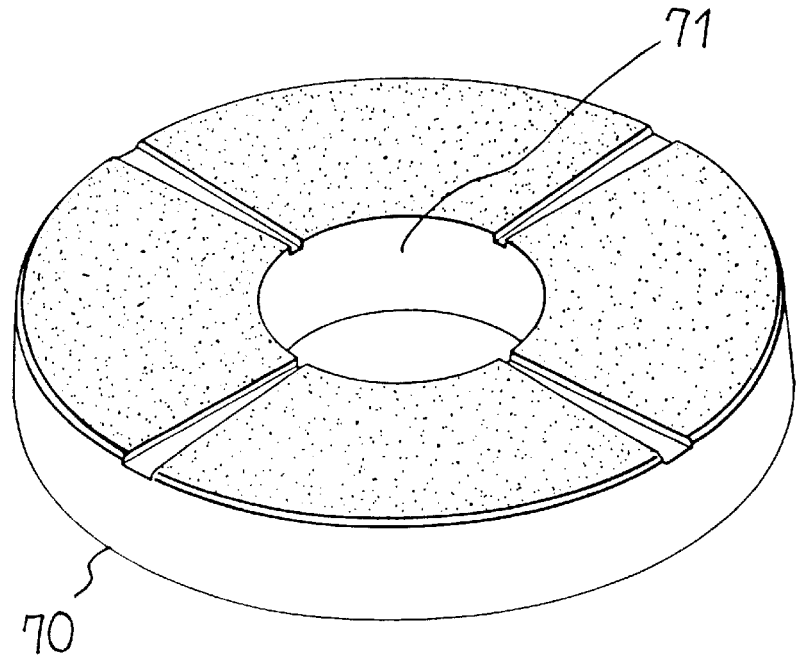

In addition to the protective structure described above, the present invention discloses an applicator for applying the protective film 10 and the two-side-adhesive ring 20 of the present invention to the compact disc 50. As shown in FIG. 4, the applicator of the present invention comprises a press cover 60 and an alignment ring 70 having an inner hole 71 equal in diameter to the center hole 52 of the compact disc 50 shown in FIG. 1. The alignment ring 70 has an outer diameter equal to or slightly larger than the protruded ring 51 of the compact disc 50 and slightly smaller than the inner diameter of the two-side-adhesive ring 20. In application, the compact disc 50 is first put upside down in the cassette such that the reading area 58 of the compact disc 50 is on the upper side, and that the elastic retaining piece of the cassette is jutted out of the center hole 52 of the compact disc 50. The inner hole 71 of the alignment ring 70 is then fitted over the elastic retaining piece of the cassette, thereby joining the alignment ring 70 with compact disc 50 in a concentric manner. The releasing paper on one side of the two-side-adhesive ring 20 is removed prior to fitting the ring 20 to the outer periphery of the alignment ring 70. The ring 20 is then moved toward the labeling area 53 of the compact disk 50 by the press cover, wherein the alignment ring 70 is covered with the press cover 60, and the press cover 60 is then pressed to cause the ring 20 to adhere to the labeling area 53 of the compact disc 50. Accordingly, it is almost impossible for the ring 20 accidentally adhering to the reading area 58 of the compact disc 50. The press cover 60 is subsequently removed to enable the removal of the releasing paper on another side of the ring 20. The protective film 10 is aligned with and received by the alignment ring 70 received before the alignment ring 70 is once again covered with the press cover 60. As the press cover 60 is pressed, the inner annular portion of the protective film 10 is adhered to the ring 20. The protective film 10 is pressed gently with finger to attach to the reading area 58 of the compact disc 50 by static attraction. It must be noted here that the press cover 60 has a hollow cylindrical body at one end thereof, and the hollow cylindrical body has an inner diameter which is slightly greater than an outer diameter of the alignment ring 70, and has a wall thickness which is slightly smaller than the width of the two-side-adhesive ring 20.

What is claimed is:

1. A structure for protecting a reading area at one side of a compact disc, said structure comprising:

a transparent circular plastic film having an outer diameter equal to or smaller than an outer diameter of the compact disc, said circular plastic film further having a center hole with a diameter greater than a protruded ring on said one side of the compact disc; and a two-side-adhesive ring having an inner diameter equal to or greater than the protruded ring of the compact disc, said two-side-adhesive ring further having an outer diameter greater than said inner diameter by 2–5 mm;

wherein one side of said two-side-adhesive ring is adhered to an inner annular portion of said circular plastic film and another side of said two-side-adhesive ring is adapted to adhere to said one side of the compact disc with the protruded ring thereof surrounded by the two-side-adhesive ring, wherein said transparent circular plastic film is concentrically attached to said two-side-adhesive ring, and can be attached to the reading area of the compact disc by static attraction when said another side of said two-side-adhesive ring is adhered to said one side of the compact disc.

2. A structure for protecting a reading area at one side of a compact disc, said structure comprising:

a transparent circular plastic film having an outer diameter equal to or smaller than an outer diameter of the compact disc, said circular plastic film further having a center hole with a diameter greater than a protruded ring on said one side of the compact disc;

a two-side-adhesive ring having an inner diameter equal to or greater than the protruded ring of the compact disc, said two-side-adhesive ring further having an outer diameter greater than said inner diameter by 2–5 mm;

wherein one side of said two-side-adhesive ring is adhere to an inner annular portion of said circular plastic film and another side of said two-side-adhesive ring is adapted to adhered to said one side of the compact disc with the protruded ring thereof surrounded by the two-side-adhesive ring, wherein said transparent circular plastic film is concentrically attached to said two-side-adhesive ring, and can be attached to the reading area of the compact disc by static attraction when said another side of said two-side-adhesive ring is adhered to said one side of the compact disc; and an alignment ring provided with an inner hole having a diameter substantially equal to the diameter of the center hole of the compact disc, said alignment ring having an outer diameter equal to or greater than the protruded ring of the compact disc and smaller than said inner diameter of said two-side-adhesive ring.

3. The structure as defined in claim 2 further comprising a press cover having a hollow cylindrical body, and said hollow cylindrical body has an inner diameter greater than said outer diameter of said alignment ring and an outer diameter smaller than said outer diameter of said two-side-adhesive ring.

4. A compact disc having a protecting structure on a reading area at one side of said compact disc, comprising:

a transparent circular plastic film having an outer diameter equal to or smaller than an outer diameter of the compact disc, said circular plastic film further having a center hole with a diameter greater than a protruded ring on said one side of the compact disc; and a two-side-adhesive ring having an inner diameter equal to or greater than the protruded ring of the compact disc, said two-side-adhesive ring further having an outer diameter greater than said inner diameter by 2–5 mm;

wherein one side of said two-side-adhesive ring is adhered to an inner annular portion of said circular plastic film and another side of said two-side-adhesive ring is adhered to said one side of the compact disc with the protruded ring thereof surrounded by the two-side-adhesive ring, wherein said transparent circular plastic film is concentrically attached to said two-side-adhesive ring, and is attached to the reading area of the compact disc by static attraction.

* * * * *